United States Patent [19]

Reuter

[11] Patent Number: 5,373,604
[45] Date of Patent: Dec. 20, 1994

[54] CLEANING COMPOSITE FOR OPTICAL AND MAGNETO-OPTICAL STORAGE DISKS

[75] Inventor: Klaus Reuter, Wiesbaden, Germany

[73] Assignee: Hoechst Aktiengesellschaft, Frankfurt am Main, Germany

[21] Appl. No.: 53,384

[22] Filed: Apr. 28, 1993

[30] Foreign Application Priority Data

May 8, 1992 [DE] Germany .................... 9206173[U]

[51] Int. Cl.⁵ .................................................. B08B 1/00
[52] U.S. Cl. ................................... 15/209.1; 15/210.1
[58] Field of Search ................. 15/209.1, 210.1, 208

[56] References Cited

U.S. PATENT DOCUMENTS

| | | | |
|---|---|---|---|
| 4,359,798 | 11/1982 | Loran | 15/104.94 |
| 4,510,640 | 4/1985 | Omori | 15/209.1 X |
| 4,820,558 | 4/1989 | Sundberg | 428/34.3 |
| 4,993,099 | 2/1991 | Emura et al. | 15/209.1 X |
| 5,141,803 | 8/1992 | Pregozen | 15/209.1 X |
| 5,229,191 | 7/1993 | Austin | 15/209.1 X |
| 5,264,269 | 11/1993 | Kakiuchi et al. | 15/209.1 X |

FOREIGN PATENT DOCUMENTS

0417726A2  3/1991  European Pat. Off. .

*Primary Examiner*—Chris K. Moore
*Attorney, Agent, or Firm*—Foley & Lardner

[57] ABSTRACT

A cleaning composite for optical and magneto-optical storage disks includes a rectangular strip of a textile or fabric cloth composed of a material capable of absorbing a cleaning liquid; and a rectangularly shaped plastic film; wherein the strip of the textile or fabric cloth and the plastics film are connected to one another along opposite narrow sides. Preferably the strip and the plastics film have the same size. The strip includes a fluff-free clean-room material produced from filament yarn. The strip and the plastics film are thermally bonded to one another along their narrow sides or are adhesively bonded to one another by means of a self-adhesive tape along adhesive strips along their narrow sides.

15 Claims, 1 Drawing Sheet 5,373,604

CLEANING COMPOSITE FOR OPTICAL AND MAGNETO-OPTICAL STORAGE DISKS

BACKGROUND OF THE INVENTION

The invention relates to a cleaning composite for optical and magneto-optical storage disks, composed of a material capable of absorbing a cleaning liquid.

Cleaning cloths are used both for dry and for wet cleaning of storage disks. For wet cleaning, a drop of a cleaning liquid is applied to a cleaning cloth, the cleaning liquid being, in general, alcohols dissolved in water, to which wetting agents, antistatic agents and surfactants have been added. With the cleaning cloth moistened in this manner, that section of the storage disk which is accessible through the shutter opening in the disk cassette is wiped from the inside to the outside in order to remove dust, fingerprints, electrostatic charges and the like.

EP-A-0417726 discloses, for example, a book-like container in which a disk cassette with an optical storage disk is held when the shutter is open. The container contains a shutter locking means for opening the disk cassette shutter and a spindle which supports the optical storage disk so that it can rotate. An attachment for rotating the storage disk simplifies the manual rotation of the storage disk during the cleaning operation, which is carried out with the aid of a cleaning cloth and a cleaning liquid. The rotation attachment and the cleaning materials are housed in the book-like housing.

Another cleaning means on the market has an electrically driven spindle bearing on which the storage disk to be cleaned is mounted in order to rotate it by means of an electric drive during the cleaning operation. Cleaning is carried out by pressing a cleaning cloth impregnated with the cleaning liquid against that section of the storage disk which is exposed by the shutter. This cleaning means operates completely automatically in that the cleaning cloth or the cleaning pad is moved radially toward the circumference of the storage disk by means of a motor while the storage disk rotates simultaneously. More detailed investigations show that, in this completely automatic cleaning means, the cleaning pads very frequently rest unevenly on the surface of the storage disk to be cleaned, so that cleaning takes place in a very nonuniform manner. Individual gauging of the contact pressure of the cleaning pad on the storage disk is not possible.

In the case of the known cleaning cloths, fold-free contact with the storage disk during the cleaning operation is in general likewise impossible, so that the cleaning effect is nonuniform since the contact area on the storage disk is not continuous, owing to folding of the cleaning cloth. The known cleaning cloths cannot be stored without individual packaging or an intermediate layer, since soiling of the back when solvents are used leads to soiling of the cleaning side of the cloths.

SUMMARY OF THE INVENTION

It is an object of the invention to design a cleaning composite in such a way that fold-free contact of the cleaning composite with the storage disk and a uniform contact pressure which can be adapted to specific requirements are ensured.

This object is achieved, according to the invention, by a cleaning composite for optical and magneto-optical storage disks, which includes a rectangular strip of a textile or fabric cloth composed of a material capable of absorbing a cleaning liquid; and a rectangularly shaped plastics film; wherein the strip of the textile or fabric cloth and the plastics film are connected to one another along opposite narrow sides.

In one embodiment of the invention, the textile or fabric cloth includes a fluff-free clean-room material produced from filament yarn.

For the cleaning operation, the ends of the cleaning composite are pressed together so that it is curved outward in an arc-like manner with the textile or fabric cloth. The elasticity of the plastics film has the advantage that the textile or fabric cloth rests without folds against the plastics film and is therefore also in contact with the storage disk over the entire surface during cleaning. This ensures that cleaning takes place without stripe formation. The applied contact pressure remains substantially constant owing to the elasticity of the plastics film and can be adapted at any time to the requirements by manual guidance of the cleaning composite.

Another advantage is that the major part of the available surface of the cleaning composite can be used section by section, so that the degree of utilization is very high.

Further objects, features, and advantages of the invention will become apparent from the following description taken in conjunction with the drawings.

BRIEF DESCRIPTION OF THE DRAWINGS

The invention is illustrated in detail below with reference to embodiments shown in the drawings. The drawings are hereby expressly made a part of the specification.

DETAILED DESCRIPTION OF THE PREFERRED EMBODIMENTS

Figure 1:
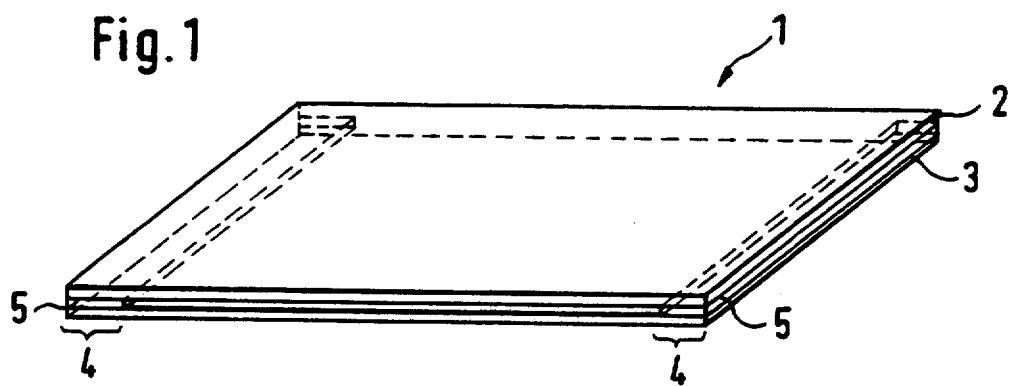
FIG. 1 shows a perspective view of a section through a cleaning composite according to the invention.

FIG. 1 shows a perspective sectional view of a cleaning composite 1 according to the invention. The cleaning composite comprises a rectangular, strip-like textile or fabric cloth 2 and a plastics film 3 of the same shape and size and comprising an elastic plastic having a thickness of up to 0.50 mm. A suitable plastic is, for example, a rigid PVC film having a thickness of 0.15 mm. The textile or fabric cloth 2 and the plastics film 3 are thermally bonded at the opposite narrow sides or adhesively bonded to one another along adhesive strips 4,4 with the aid of a self-adhesive tape 5. The fabric cloth 2 is absolutely fluff-free and comprises a so-called clean-room material which is produced from filament yarn. Because the fabric cloth 2 and the plastics film 3 are thermally bonded or are connected to one another via the self-adhesive tape only at two edges, i.e. at their narrow sides, and in the latter case there is no adhesive bonding over the entire surface, there is also no danger that the cleaning liquid applied to the fabric cloth might attack and dissolve the adhesive. The plastics film 3 has a high elasticity constant and ensures that, when the cleaning composite is curved in an arc-like manner, the fabric cloth rests without folds against the plastics film, due to the tensile stress exerted by the latter. The cleaning composite may also be provided with a shorter textile or fabric covering than the plastics film, because that part of the composite which is gripped need not be covered with textiles. The textile covering is then connected along its narrow sides to the plastics film by thermally bonding or by adhesive bonding by means of a self-adhesive tape along adhesive strips.

The fabric cloth 2 is in general washable up to a temperature of 100° C. and can also be decontaminated and has a high absorptivity for the cleaning liquid. In general, a filament yarn containing 60–80% by weight of polyester, the remainder being nylon, is used for the clean-room material of the fabric cloth 2, the clean-room material comprising in particular 70% by weight of polyester and 30% by weight of nylon. The weight per unit area of the clean-room material is between 160 and 180 g/m², in particular 170 g/m².

The length of the rectangular strip of the fabric cloth and of the plastics film of the same shape and size is in the range from 50 to 70 mm and the width is 20 to 35 mm. In a preferred embodiment, the length of the cleaning composite is 60 mm and the width is 30 mm. The width is adapted to the disk cassette opening of the disk to be cleaned. The width of the adhesive strips 4,4 is chosen to be about 5 mm.

The self-adhesive tape 5 comprises a substrate material, for example a transparent PVC film having a thickness of 0.09 mm. The adhesive applied to both sides of the self-adhesive tape 5 is, for example, a synthetic rubber. The tensile strength of the self-adhesive tape is up to 80 N/25 mm width, the elongation at break is 40% and the heat resistance is 45° C. for a continuous load and may be up to 65° C. for a brief peak load.

Figure 2:
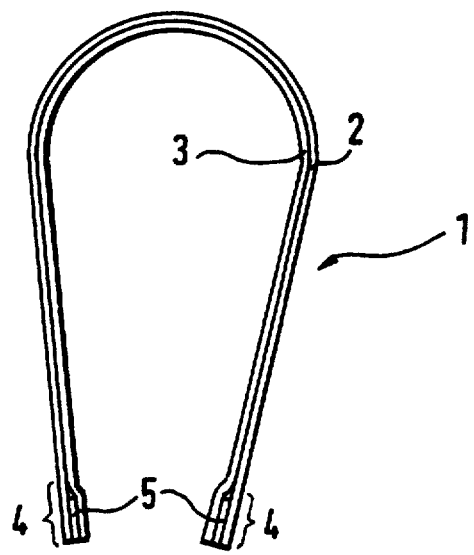
FIG. 2 shows a cleaning composite according to FIG. 1, curved in an arc-like manner.

FIG. 2 shows schematically the form of the cleaning composite 1 in its operating state. For this purpose, the ends or the narrow sides of the cleaning composite 1 are brought together so that the cleaning composite curves in an arc-like manner due to the elasticity of the plastics film 3 which is present inside. The fabric cloth 2 rests without folds on the plastics film 3 and is impregnated with one or more drops of cleaning liquid.

The cleaning operation can than be carried out by guiding the curved cleaning composite over the storage disk radially from the inside to the outside under controlled contact pressure. As soon as the contact surface of the fabric cloth 2 is soiled by the storage disk, the cleaning composite is folded together in such a way that a fresh, clean contact surface now rests against the storage disk. Of course, the two ends or narrow sides of the cleaning composite 1 are then no longer at the same height, as shown in FIG. 2, but are displaced vertically relative to one another. It is thus possible to utilize the major part of the available contact surface or cleaning surface of the cleaning composite 1 between the adhesive strips 4,4 for the cleaning.

Figure 3:
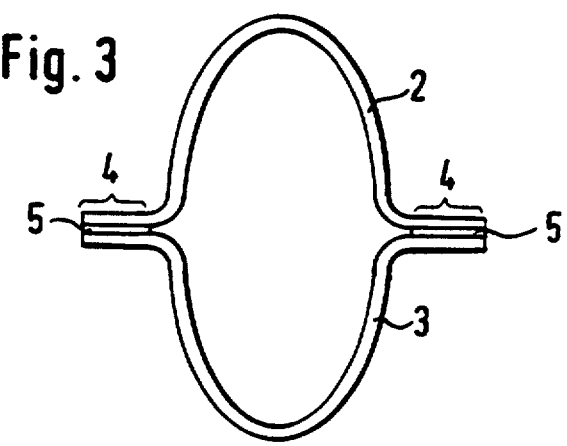
FIG. 3 shows the cleaning composite with its two narrow sides pushed together.

FIG. 3 shows schematically a cleaning composite 1 in which the two ends or narrow sides are pushed toward one another with the adhesive strips 4,4 so that, due to the elasticity of the plastics film 3, the latter curves downward while the fabric cloth 2 acquires a similar curvature in an upward direction. FIG. 3 is merely intended to illustrate the fact that, as a result of the elasticity of the plastics film 3, the fabric cloth adhesively bonded to it is under tensile stress in every position except the rest position.

While the invention has been described with reference to certain preferred embodiments, numerous alterations, modifications, and changes to the preferred embodiments are possible without departing from the spirit and scope of the invention, as defined in the appended claims, and equivalents thereof.

What is claimed is:

1. A cleaning composite for optical and magneto-optical storage disks, comprising:
   a rectangular strip of a textile or fabric cloth composed of a material capable of absorbing a cleaning liquid;
   a rectangularly shaped plastics film wherein
   the strip of the textile or fabric cloth and the plastics film are connected to one another along opposite narrow sides; and
   a self-adhesive tape, wherein the strip and the plastics film are adhesively bonded to one another by means of the self-adhesive tape along adhesive strips along sides of the strip and the plastics film.

2. The cleaning composite of claim 1, wherein the strip and the plastics film have the same size.

3. The cleaning composite as claimed in claim 1, wherein the strip comprises a fluff-free clean-room material produced from filament yarn.

4. The cleaning composite as claimed in claim 3, wherein the clean-room material includes 60 to 80% by weight of polyester, the remainder being nylon.

5. The cleaning composite as claimed in claim 4, wherein the clean-room material contains 70% by weight of polyester and 30% by weight of nylon.

6. The cleaning composite as claimed in claim 4, wherein the weight per unit area of the clean-room material is between 160 and 180 g/m².

7. The cleaning composite of claim 6, wherein the weight per unit area is 170 g/m².

8. The cleaning composite as claimed in claim 1, wherein the plastics film comprises an elastic plastic having a thickness of up to 0.50 mm.

9. The cleaning composite of claim 8, wherein the thickness is 0.15 mm.

10. The cleaning composite as claimed in claim 1, wherein the strip and the plastics film are thermally bonded to one another along their narrow sides.

11. A cleaning composite for optical and magneto-optical storage disks, comprising:
    a rectangular strip of a textile or fabric cloth composed of a material capable of absorbing a cleaning liquid;
    a rectangularly shaped plastics film wherein
    the strip of the textile or fabric cloth and the plastics film are connected to one another along opposite narrow sides; and
    wherein the strip of textile or fabric cloth is shorter than the plastics film, and the strip is connected along its narrow sides to the plastics film.

12. The cleaning composite as claimed in claim 1, wherein lengths of the rectangular strip and the plastics film are about 60 mm and their widths are about 30 mm.

13. The cleaning composite of claim 1, wherein the width of the adhesive strips is about 5 mm.

14. The cleaning composite as claimed in claim 1, wherein the self-adhesive tape further comprises:
    a substrate material including a transparent PVC film having a thickness of about 0.09 mm; and
    an adhesive applied on both sides of the self-adhesive tape wherein the adhesive comprises a synthetic rubber.

15. The cleaning composite as claimed in claim 14, wherein the tensile strength of the self-adhesive tape is up to 80 N/25 mm width, the elongation at break is 40%, and the heat resistance is 45° C. for continuous exposure and up to 65° C. for short-term exposure.

* * * * *

UNITED STATES PATENT AND TRADEMARK OFFICE
CERTIFICATE OF CORRECTION

PATENT NO. : 5,373,604
DATED : December 20, 1994
INVENTOR(S) : REUTER

It is certified that error appears in the above-indentified patent and that said Letters Patent is hereby corrected as shown below:

Column 4, line 16, Claim 1, after "along" insert --the narrow--.

Signed and Sealed this

Sixteenth Day of May, 1995

Attest:

BRUCE LEHMAN

Attesting Officer          Commissioner of Patents and Trademarks